No. 779,540. PATENTED JAN. 10, 1905.
H. FREISE.
DEVICE FOR DISTRIBUTING DUST IN DUST CARTS.
APPLICATION FILED JUNE 23, 1904.
*Fig. 1.*
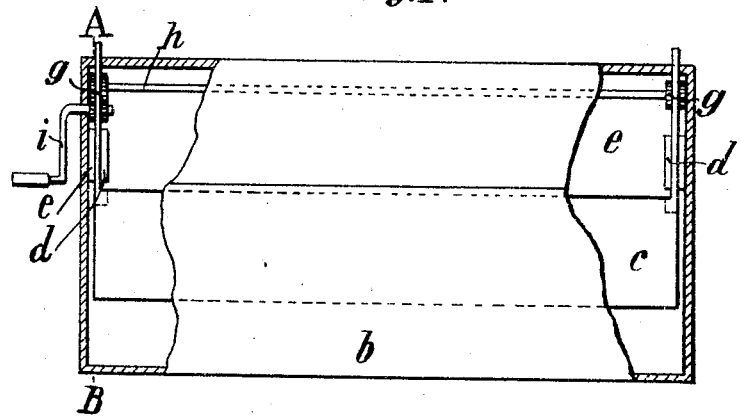
*Fig. 2.* *Fig. 3.*
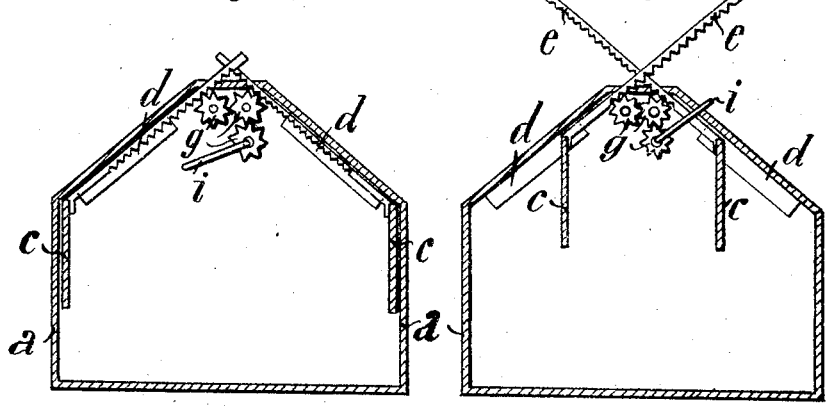
*Fig. 4.*
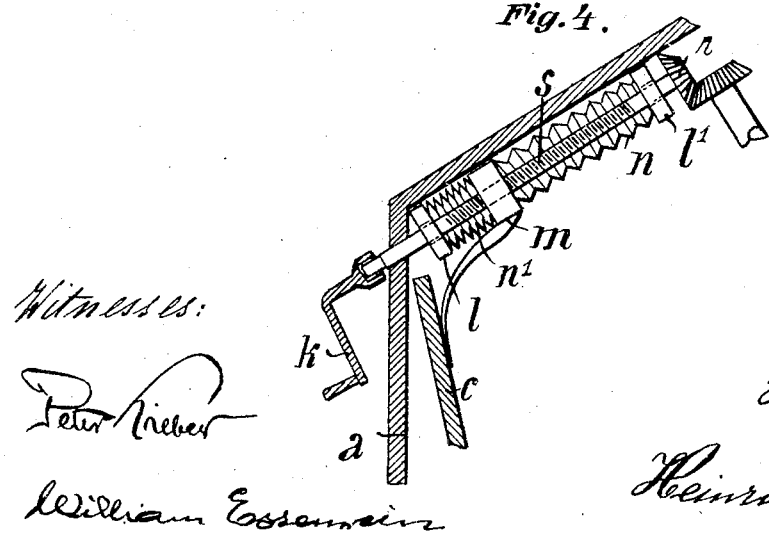
Witnesses:
Peter Rieber
William Essenwein
Inventor:
Heinrich Freise No. 779,540. Patented January 10, 1905.

UNITED STATES PATENT OFFICE.

HEINRICH FREISE, OF HAMME, NEAR BOCHUM, GERMANY.

DEVICE FOR DISTRIBUTING DUST IN DUST-CARTS.

SPECIFICATION forming part of Letters Patent No. 779,540, dated January 10, 1905.

Application filed June 23, 1904. Serial No. 213,856.

*To all whom it may concern:*

Be it known that I, HEINRICH FREISE, a subject of the German Emperor, and a resident of Hamme, near Bochum, Germany, have invented certain new and useful Improvements in Devices for Distributing Dust in Dust-Carts, of which the following is a specification.

The subject of this invention is a device for distributing dust and rubbish in dust-carts in a uniform manner and without any trouble.

On the accompanying drawings, in which similar letters refer to similar parts throughout the several views, is represented in Figure 1 a vertical longitudinal section through the body or trunk of the cart, and in Figs. 2 and 3 a cross-section on the line A B through a trunk of a cart, showing a form of construction of the invention.

At the side walls $a$ of the trunk $b$ of the cart, Fig. 2, there are arranged two other side walls $c$, which can be shifted to the middle of the cart, as shown in Fig. 3. To the side walls $c$ are fixed racks $e$, guided in U-irons or similar devices. Two racks $e$, crossing one another, engage with a connecting gearing formed by toothed wheels $g$. A toothed wheel at the front end of the cart is connected through a shaft $h$ with the corresponding toothed wheel at the hind end of the trunk $b$ of the cart. By means of the crank $i$ and the toothed wheels $g$ the racks $e$, and thereby the movable side walls $c$, are moved toward the inside or outside.

Fig. 4 shows another form of construction of the invention. The movable side wall $c$ is rigidly connected to a nut $m$, which can be screwed to and fro on the spindle $s$. This spindle $s$ is journaled in two bearings $l$ and $l'$ on the trunk of the cart and can be rotated by means of the crank $k$. In order to make it feasible that the two side walls $c$ may be moved at the same time by means of one crank $k$, two spindles $s$ are coupled by a pair of conical toothed wheels $r$. In order that no dirt may settle in the threads of the spindle $s$, there have been provided leather coverings $n$, which can be drawn out in harmonica fashion, of which one part, $n'$, is shown in Fig. 4 folded together, while the other half, $n$, is drawn out. On the nut $m$ being turned upward the covering $n$ is folded in the opposite way. At the commencement of the loading of the cart the side walls $c$ touch the outer sides of the trunk of the cart. If now the cart is filled at the sides up to the covering, Fig. 2, the dust before the side walls $c$ is moved, Fig. 3. After the side walls $c$ have been shifted back to the walls $a$ of the trunk the empty space formed in this way is filled.

What I claim as my invention, and desire to secure by United States Letters Patent, is—

In dust-carts with devices for distributing the dust, the combination with immovable outer walls of the trunk of the cart of movable inner walls, parallel to the outer walls, and means for moving the inner walls simultaneously and parallelly toward the middle of the trunk, substantially as and for the purpose set forth.

In testimony whereof I have signed my name to this specification in the presence of two subscribing witnesses.

HEINRICH FREISE.

Witnesses:
PETER LIEBER,
WILLIAM ESSENWEIN.